US011177945B1

(12) United States Patent
Xu

(10) Patent No.: US 11,177,945 B1
(45) Date of Patent: Nov. 16, 2021

(54) CONTROLLING ACCESS TO ENCRYPTED DATA

(71) Applicant: International Business Machines Corporation, Armonk, NY (US)

(72) Inventor: Chun Lei Xu, Xian (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/937,629

(22) Filed: Jul. 24, 2020

(51) Int. Cl.
 *H04L 29/06* (2006.01)
 *H04L 9/08* (2006.01)
 *H04L 9/32* (2006.01)
 *G06F 21/62* (2013.01)

(52) U.S. Cl.
 CPC ........ *H04L 9/0825* (2013.01); *G06F 21/6209* (2013.01); *G06F 21/6218* (2013.01); *H04L 9/0861* (2013.01); *H04L 9/3236* (2013.01); *H04L 63/10* (2013.01); *H04L 2209/60* (2013.01)

(58) Field of Classification Search
 CPC ..... H04L 63/10; H04L 9/0825; H04L 9/3236; H04L 9/0861; H04L 2209/60; G06F 21/6209; G06F 21/6218
 See application file for complete search history.

(56) References Cited

U.S. PATENT DOCUMENTS

| 6,757,675 | B2 | 6/2004 | Aiken |
| 8,224,754 | B2 | 7/2012 | Pastusiak |
| 8,543,543 | B2 | 9/2013 | Marcelais |
| 8,607,017 | B2 | 12/2013 | Condict |
| 8,930,686 | B2 | 1/2015 | Augenstein |
| 2004/0062400 | A1* | 4/2004 | Sovio ............... H04L 9/3226 380/286 |
| 2014/0289513 | A1* | 9/2014 | Huang ............... G06F 21/6218 713/160 |
| 2015/0332178 | A1* | 11/2015 | Sorotokin ............ H04L 63/10 705/59 |
| 2018/0225179 | A1 | 8/2018 | Donaghy |
| 2020/0092097 | A1* | 3/2020 | Chiu ............... G06Q 20/3678 |
| 2020/0220719 | A1* | 7/2020 | Chaudhari ........... H04L 9/0869 |
| 2021/0165896 | A1* | 6/2021 | Bignotti ............. G06F 21/6218 |

FOREIGN PATENT DOCUMENTS

GB  2440174 A  1/2008

OTHER PUBLICATIONS

"Ciphertext-Policy Attribute-Based Encryption", Advanced Crypto Software Collection, updated Mar. 24, 2011, 1 page, <http://acsc.cs.utexas.edu/cpabe/>.

(Continued)

*Primary Examiner* — Thaddeus J Plecha
(74) *Attorney, Agent, or Firm* — David K. Mattheis; Maeve M. Carpenter

(57) ABSTRACT

Enabling access to encrypted information by providing a master key and a public key to a partial content owner, generating a ciphertext of content according to a complete content data, at least one content data partition and the public key, wherein the content data partition comprises a portion of the complete content data, providing the ciphertext of the content data and the public key to a validator, receiving a validation result from the validator, and acting upon the validation result.

20 Claims, 5 Drawing Sheets

(56) References Cited

OTHER PUBLICATIONS

Bethencourt et al., "Ciphertext-Policy Attribute-Based Encryption", The University of Texas at Austin, printed Feb. 18, 2020, 15 pages, <https://www.cs.utexas.edu/%7Ebwaters/publications/papers/cp-abe.pdf>.

Cao et al., "Privacy-Preserving Query over Encrypted Graph-Structured Data in Cloud Computing", UbiSeC Lab, printed Feb. 18, 2020, 10 pages, <https://ubisec.cse.buffalo.edu/cloud/papers/ICDCS11-search.pdf>.

Fowke et al., "Text Categorization and Similarity Analysis: Implementation and Evaluation", Dec. 2013, Department of Computer Science, University of Waikato, Private Bag 3105, Hamilton, New Zealand, Pingar International Ltd., 152 Quay St, Auckland, New Zealand, 30 pages.

Mell et al., "The NIST Definition of Cloud Computing", Recommendations of the National Institute of Standards and Technology, Special Publication 800-145, Sep. 2011, 7 pages.

* cited by examiner

CONTROLLING ACCESS TO ENCRYPTED DATA

BACKGROUND

The disclosure relates generally to controlling access to encrypted information. The disclosure relates particularly to validating requests for access to encrypted information across a set of authorized entities.

Hashing algorithms, hash functions, provide a mechanism to covert arbitrary length content data to fixed length data. The values returned by such hash functions do not reveal the original content, neither can the function be reversed to reveal the original content data.

Hashing algorithms enable two pieces of content to be prepared by comparing their hash function values. When the hash function values are identical, the two pieces of content are also identical. Hash functions can be used to determine if any particular piece of content has been changed. Altering the original content results in an altered hash function value.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable the control of access to encrypted information across a set of authorized entities.

Aspects of the invention disclose methods, systems and computer readable media associated with enabling access to encrypted information by providing a master key and a public key to a partial content owner, generating a ciphertext of content according to a complete content data, at least one content data partition and the public key, wherein the content data partition comprises a portion of the complete content data, providing the ciphertext of the content data and the public key to a validator, receiving a validation result from the validator, and acting upon the validation result.

Aspects of the invention disclose methods, systems and computer readable media associated with enabling access to encrypted information by receiving a master key and a public key, generating a private key suing the master key, the public key and a content data partition, and providing the generated private key to a validator.

Aspects of the invention disclose methods, systems and computer readable media associated with enabling access to encrypted information by receiving a public key and a ciphertext of content data, receiving a private key generated according to a master key, the public key and a content data partition, and validating the private key according to the ciphertext and public key.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
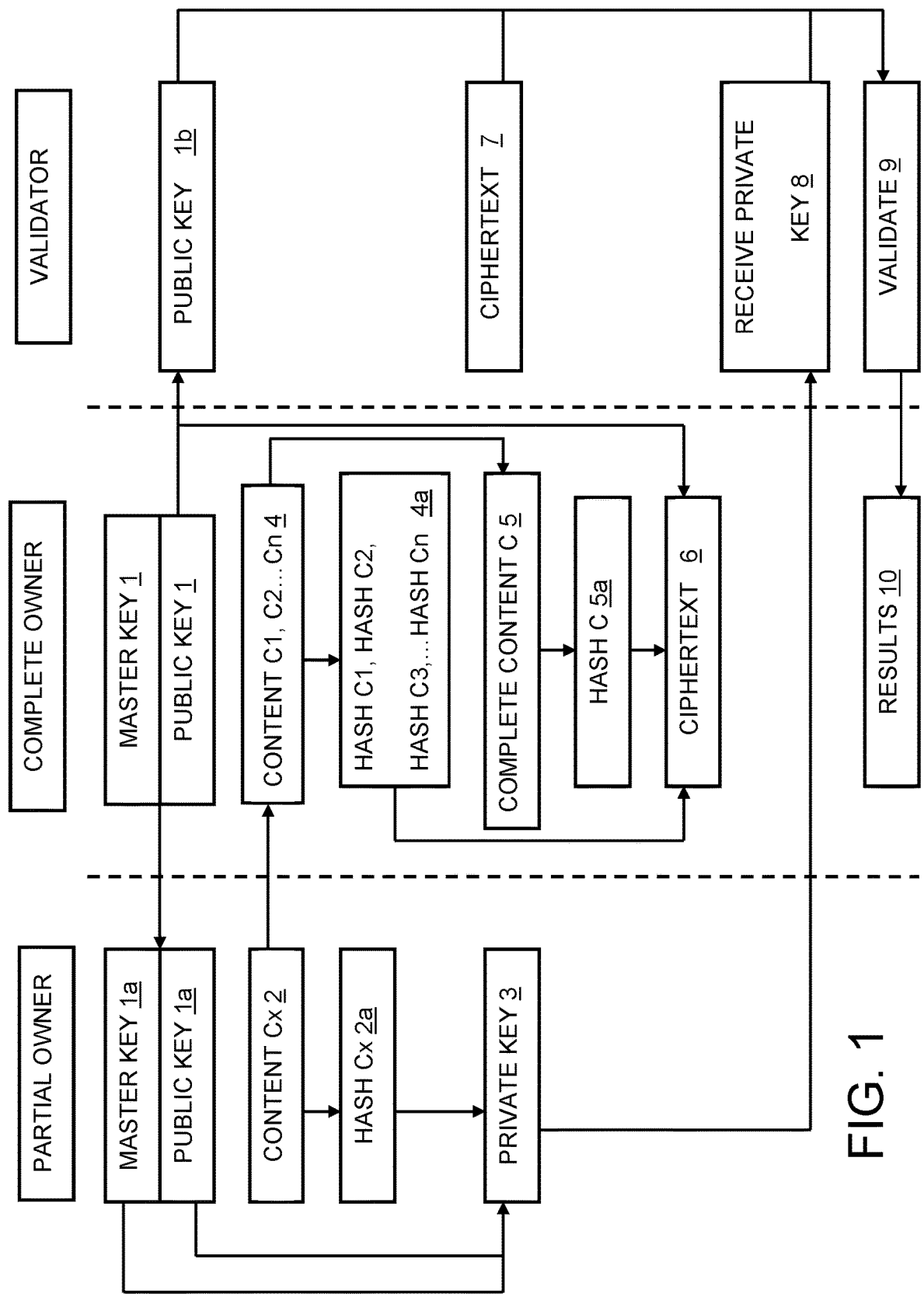
FIG. 1 provides a schematic illustration of validation steps associated with enabling access to content, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an embodiment, one or more components of the system can employ hardware and/or software to solve problems that are highly technical in nature (e.g., generating a master key and a public key, generating a ciphertext of content data using the public key and a portion of the content data, etc.). These solutions are not abstract and cannot be performed as a set of mental acts by a human due to the processing capabilities needed to facilitate access to encrypted data, for example. Further, some of the processes performed may be performed by a specialized computer for carrying out defined tasks related to memory operations. For example, a specialized computer can be employed to carry out tasks related to enabling secure access to encrypted data, or the like.

Enabling access to secured content while also limiting that access to a set of authorized entities requires validating the authorization of an entity. In other words, there must be a mechanism to validate that a requesting entity belongs to the set of authorized entities. To preserve the privacy of requesting entities and also to preserve the security of the content, the validation mechanism should not reveal either the content or the identity of the entity requesting access to the content.

As an example, the usefulness of personal health information records including personal health data as well as a patient's digital signature and the digital signature of one or more care providers, increases when the patient and the care providers can access the health records while also otherwise limiting access to the records and keeping the records secure. As another example, each party to an agreement provides a digital signature. The final agreement includes the text of the agreement combined with the signatures of each party. Limiting access to the final agreement while preserving the confidentiality of the agreement terms and providing evidence that the terms of the agreement have not been altered provides a level of trust and stability between the parties to the agreement. The disclosed embodiments provide methods, systems and programs which enable limited access to content where validating authorization for access preserves the privacy of a requestor as well as the confidentiality of the content.

As used herein, ciphertext refers to encrypted content. The content may be encrypted using an encryption algorithm such as ciphertext-policy attribute-based encryption (CP ABE). The encryption algorithm accepts one or more items as inputs(s), and generates and then outputs the relevant ciphertext. In an embodiment, the CP ABE algorithm accepts a public key, a complete version of the subject content data and one or more partial partitions of the content data.

In this embodiment, the CP ABE algorithm generates a set of keys including a master key and a public key. Other key generation algorithms may be used to generate the master and public keys. Each of the two keys has a fixed length determined by the key generating algorithm.

The complete version of the content includes partial partitions of the content. The number of partial partitions of the content relates to the size and complexity of the complete content. Each partial partition includes anywhere from the smallest possible sub-portion of the complete content (such as a single character of a document or a single pixel of an image) to the complete content minus the smallest possible sub-portion of the content. Each possible partition of the complete content may be used in the generation of the relevant ciphertext.

In an embodiment, a hashing function converts each partition of the complete content, as well as the complete content, from variable length data strings to fixed length data strings while also obscuring the actual data of the partitions and complete content. In this embodiment, sharing the hash of a partition of the complete content does not reveal any aspect of the actual underlying partition and complete data set.

In an embodiment, authorized entities include only those with control or ownership of a portion or partition of the complete content. In an embodiment, a system uses validation of authorization as a threshold test enabling access to further system resources including data sets, and network resources. Such a system denies access to entities failing the validation.

FIG. 1 illustrates activities carried out by each of a complete content owner/key generator, a standalone validator, and a partial content owner (authorized entity) for entity access validation, using a validation access program according to embodiments of the invention. As shown in the figure, at block 1, the complete content owner generates a master key and an associated public key. In an embodiment, a CP ABE algorithm generates the master key and public key. At block 1a, the complete content owner provides the master key and public key to a partial content owner/authorized entity. At block 1b, the complete content owner provides the public key to the standalone validator.

At block 2, the partial content owner/authorized entity provides partial content (document text, image elements, a digital signature, etc.) to the complete content owner. In an embodiment (not shown), the complete content owner provides partial content portions to each partial content owner rather than receiving partial content portions from each partial content owner. In this embodiment, the complete content owner may provide a hash function value of the partial content rather than the actual partial content. As shown in FIG. 1, at block 2a, the partial content owner generates a hash function value of the partial content using a hashing function such as MD5 or SHA256. At block 3, the partial content owner generates a private key using the master key, the public key, and the hash of the partial content or the actual partial content. In an embodiment, the partial content owner uses the CP ABE algorithm to generate the private key. In an embodiment, the partial content owner adds a predefined prefix, such as PH_ or other prefix, to the hash function value of the partial content before generating the private key from the combined prefix and hash function value for the partial content. In this embodiment, the addition of the predefined prefix provides clear demarcations between successive partial content hash function values.

In an embodiment, each generation of a private key using the CP ABE algorithm further include a random number generated by the algorithm. The inclusion of the random number in the generation of each private key ensures that the algorithm generates a unique private key each time. In an embodiment, the partial content owner/authorized entity provides the generated private key to the standalone validator, at block 8 described below, requesting validation of their authorization. In this embodiment, the generation of unique private keys with each iteration ensures partial content owner/authorized entity privacy by preventing the identification of an individual partial content owner through the repeated use of a single private key.

At block 4, the complete content owner receives partial content portions from each partial content owner/authorized entity. At block 4a, the complete content owner generates hash function values for each individual partial portion using a hashing function such as MD5 or SHA256. In this embodiment, the complete content owner utilizes the same hashing function as the partial content owner/authorized entity.

At block 5, the complete content owner compiles the complete content from the partial content portions provided by each of the partial content owners, plus any additional content held by the complete content owner. At block 5a, the complete content owner generates a hash function value for the complete content including all partial content portions, again using the same hash function utilized by the partial content owner such as MD5 or SHA256.

At block 6, the complete content owner generates a ciphertext of the complete content. In an embodiment, the method passes the partial content portions from block 4, the complete content portion from block 5, and the public key from block 1 as inputs to the ciphertext algorithm, such as CP ABE. In an embodiment, the method passes the hash function values for each partition, from block 4a, the hash function value for the complete content from clock 5a, and the public key from block 1 to the CP ABE ciphertext algorithm.

At block 7, the standalone validator receives the ciphertext of either the complete content, or the hash function value for the complete content, from the complete content owner for use in validating requests for access from authorized entities.

At block 8, the standalone validator receives a unique private key from a partial content owner associated with a request to validate authorization. Received private keys are not attributable to particular partial content owners due to the uniqueness of each generated private key.

At block 9, the standalone validator attempts to decipher the ciphertext using the public key and the private key. Private keys generated using actual partial content, in conjunction with the public key, enable deciphering results, indicating that the requesting entity is also an authorized entity. In an embodiment, the standalone validator passes notice of the successful request for validation to the complete content owner at block 10. Private keys generated without actual partial content used with the public key fail to enable proper deciphering of the ciphertext. The validation attempt fails, and the complete content owner receives notice of the validation attempt and failure. Failed validation efforts result in denial of access or cessation of business efforts controlled by the complete content owner. In an embodiment (not shown), the validator compares deciphering results obtained using each of the public key and private key. Matching results indicate a proper private key, validation success, and unmatched results indicate a validation failure.

In an embodiment, (not shown) the partial content owner/authorized entity passes a request for access together with a generated private key, to the complete content owner. The complete content owner passes the private key to the standalone validator for analysis and waits for the result. Upon receiving a positive result indicating that the validation attempt succeeded, the complete content owner proceeds to process the partial content owner/authorized entity's request for access to content.

In an embodiment, a blockchain distributed ledger provides a gatekeeping function, controlling access to content such as financial and health records, contracts, and confidential information. In this embodiment, each authorized entity provides content which becomes part of a complete set of content used for authorization. In an alternative embodiment, portions of a data set identified for use in authorization are provided to each identified authorized user.

In this embodiment, the authorized entity generates a private key based upon their partial content, as described above. The authorized entity creates a ledger entry providing the generated private key, referencing the associated ciphertext, and requesting access to resources controlled by the gatekeeping blockchain. In this embodiment, the blockchain network entities function as the standalone validators. The network entities access the ciphertext and the public key from the complete content owner (the blockchain itself) and validate the private key of the access requestor. The validators provide notice of the success or failure of the validation and the complete content owner proceeds according to the notice, providing or denying access to requested resources.

In an embodiment, after securing access, the authorized entity checks out a portion of the content, health or financial records for example, alters the records and checks them back in, or creates a new record. In this embodiment, the complete content owner generates a new complete content using the altered record and all previously provided partial contents (such as digital signature of relevant parties to the record). In this embodiment, a new ledger entry provides details of the date, time and private key used to generate the new or altered record.

In an embodiment, Alice participates in a business arrangement controlled by a complex contract having numerous secret terms, each secret term relevant to different parties. Alice has completed at least a portion of her work under the agreement and seeks payment for her work. Alice owns, or has possession and control of Term 1 of the agreement. Each participant has been provided a master key and a public key by a central authority holding the entire agreement. A secure validation entity has been provided a public key and ciphertext of the entire agreement as well as each term of the agreement. In the example, Alice generates a private key using her term, the master key, the public key, and a random number. She provides the private key to the validation entity together with her invoice for payment. The validator attempts to decipher the ciphertext using the public key and Alice's private key. With a successful deciphering of the ciphertext, Alice is validated as a content owner and she gets paid for her work according to the terms of the agreement. Alice is never aware of secret terms of the agreement unrelated to her business.

In an embodiment, Alice wants to buy a business or service having a minimum age requirement for purchase. Alice needs to validate her age as meeting the minimum requirement. She does not want to reveal other aspects of her identity. A government entity holds identity records, drivers license information etc., and categorizes individuals according to their date of birth (DOB). The government entity creates ciphertexts including the identification information for all individuals satisfying different minimum age requirements, age 21, age 30, age 35, etc. the entity generates a separate ciphertext for each age group and alters the ciphertexts over time as group members change. The government entity provides secure validators access to public keys and ciphertexts of the records of individuals. The entity also provides individuals with master keys and public keys enabling them to offer proof of a minimum age. In this embodiment, Alice generates a private key using her personal identification information as well as the master key, the public key and random number. Alice provide the private key to the validator. The validator deciphers the current ciphertext for the appropriate age group using the private key from Alice and the public key from the government entity. With a successful deciphering, the validator provides notice that Alice satisfies the minimum age requirement, without reveling any aspect of her identity to the validator, and without reveling other aspects of her identity to anyone. Alice provides a new, unique private key with each effort to validate her age.

Figure 2:
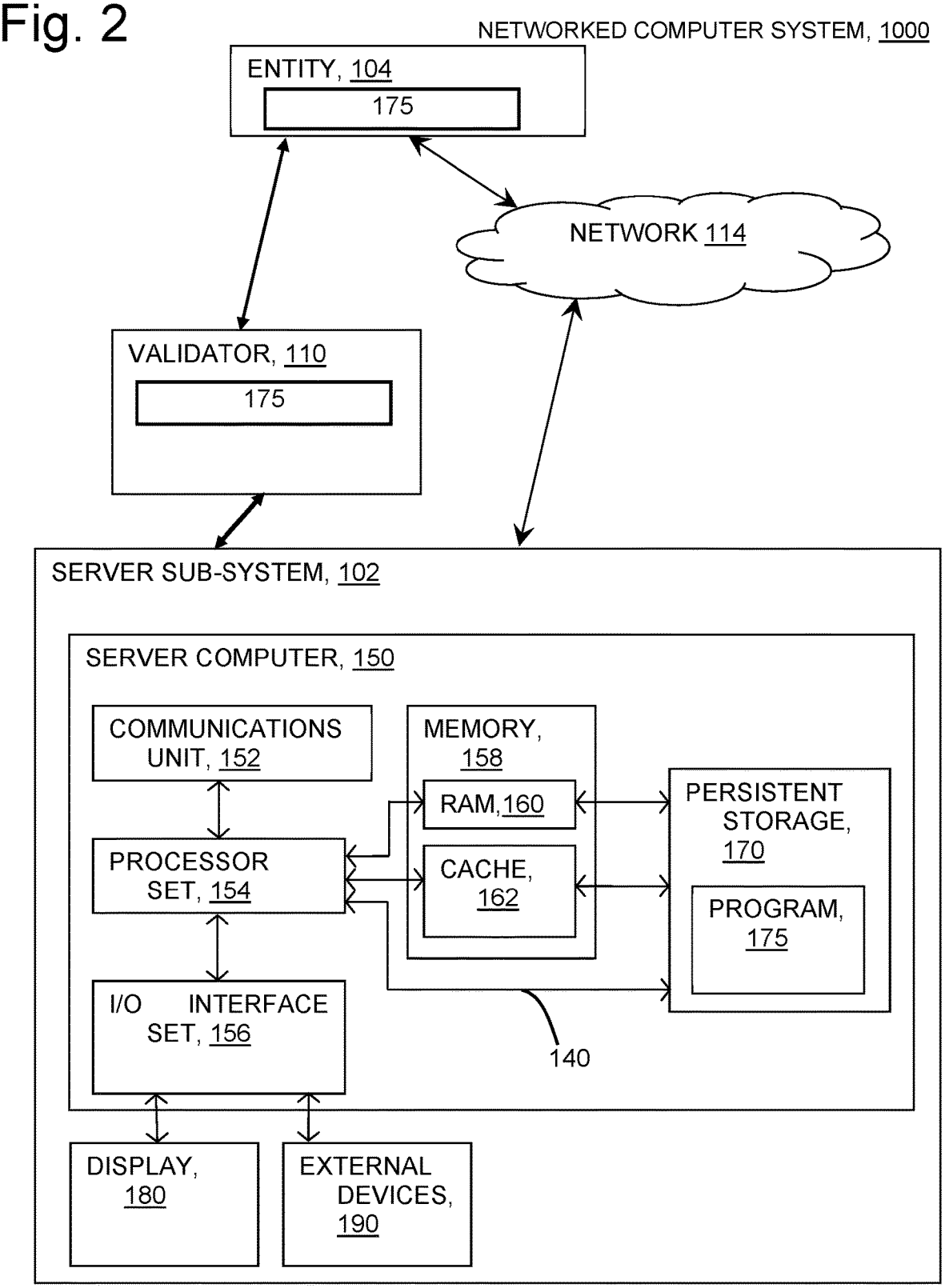
FIG. 2 provides a schematic illustration of a system, according to an embodiment of the invention.

FIG. 2 provides a schematic illustration of exemplary network resources associated with practicing the disclosed inventions. The inventions may be practiced in the processors of any of the disclosed elements which process an instruction stream. As shown in the figure, a networked standalone validation device (validator) 110 connects wirelessly to server sub-system 102. Partial content owner/authorized entity, (entity) 104 connects wirelessly to server sub-system 102 via network 114. Entity 104 and validator 110 comprise access validation program 175 together with sufficient computing resource (processor, memory, network communications hardware) to execute the program. Entity 104 and validator 110 connect wirelessly or via wired connection to each other for passing private keys from entity 104 to validator 110. As shown in FIG. 2, server sub-system 102 comprises a server computer 150. FIG. 2 depicts a block diagram of components of server computer 150 within a networked computer system 1000, in accordance with an embodiment of the present invention. It should be appreciated that FIG. 2 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the access validation program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of entity 104, and validator 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., access validation program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 3:
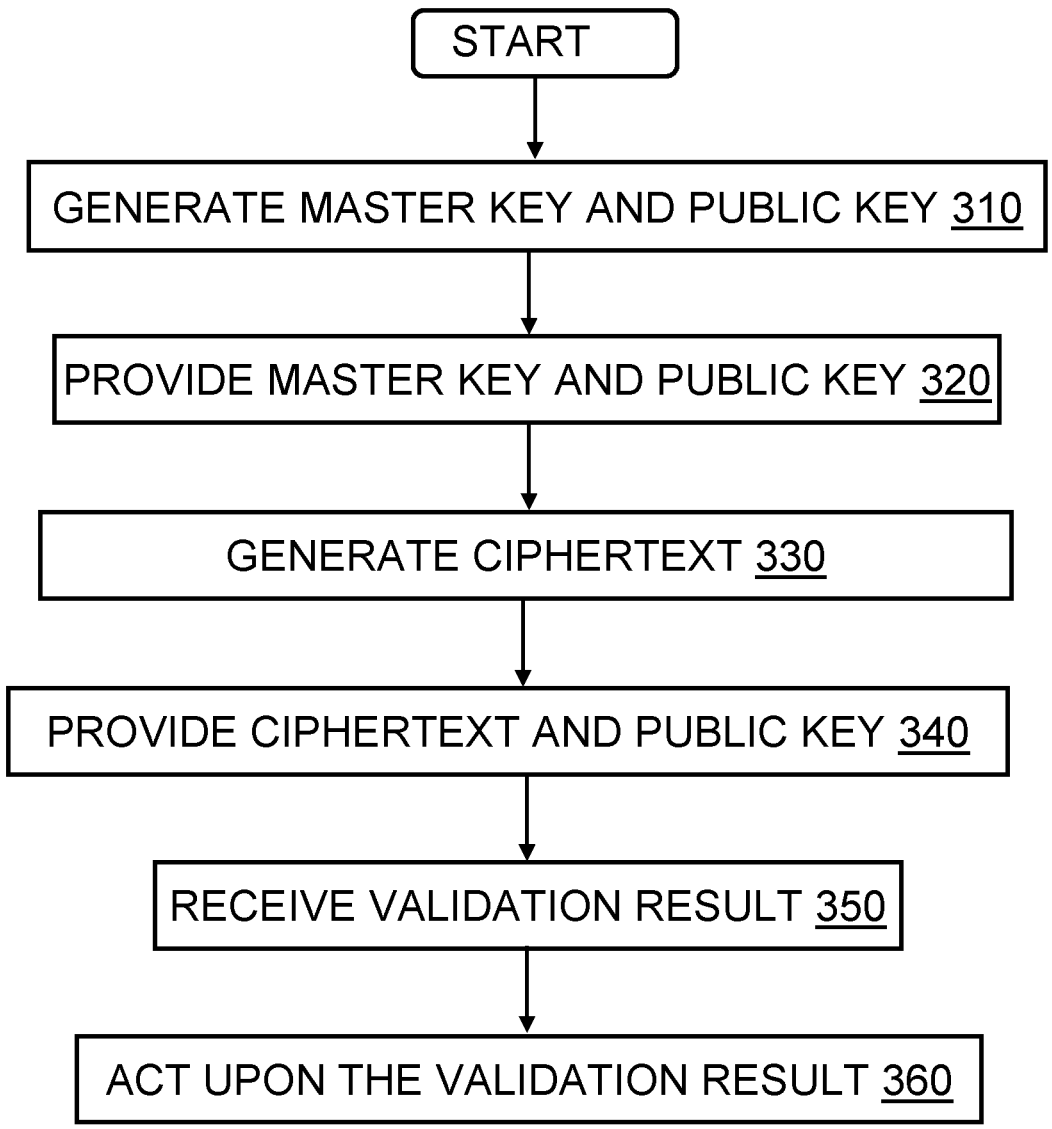
FIG. 3 provides a flowchart depicting an operational sequence, according to an embodiment of the invention.

FIG. 3 provides a flowchart 300, illustrating exemplary activities of a complete content owner, acting through access validation program 175, associated with the practice of the disclosure. After program start, at block 310 complete content owner generates a master key and a public key pair. In an embodiment, generation of the master key and public key pair includes the use of a CP ABE algorithm or similar key generation algorithm.

At block 320, the complete content owner provides copies of the master key and public key to the partial content owners. Each partial content owner receives the same master key and public key.

At block 330, the complete content owner generates a ciphertext of the complete content in combination with all partial content partitions, using the respective complete and partial content portions, an encryption algorithm such as CP ABE, and the public key. In an embodiment, the complete content owner generates the ciphertext using a hash function value for the complete content together with hash function values for each partial content partition, an encryption algorithm such as CP ABE, and the public key.

At block 340, the complete content owner provides the generated ciphertext together with the public key to one or more standalone validators. In an embodiment, the ciphertext and public key are provided by way of one or more blockchain ledger entries.

At block 350, the complete content owner receives a validation result from one or more validators. In this embodiment, each of the one or more validators has previously received a request for validation either directly from a partial content owner or indirectly from the complete content owner on behalf of the partial content owner. The request includes a private key generated by the partial content owner utilizing their partial content, or a hash function value for their partial content, together with the public key, the master key, and a random number which differs with each validation request. In an embodiment, the one or more validators deciphers the ciphertext using each of the public key and the provided private key and compare the deciphered values. matching deciphered texts indicate proper authorization for the requestor. The one or more validators pass the results of the validation to the complete content owner and in some embodiments, the partial content owner—requestor—as well. In an embodiment, the one or more validators attempt to decipher the ciphertext using the private key and public key. A successful deciphering attempt validates the private key while an unsuccessful attempt fails the validation. the results are communicated to the complete content owner.

At block 360, the complete content owner acts upon the received validation result. In an embodiment, the action simply results in providing access to the complete deciphered content or other resources under the gatekeeping control of the complete content owner. In an embodiment, the complete content owner passes the results to a blockchain smart contract enabling a properly authorized requestor to further interact with the smart contract of the blockchain. In an embodiment, a failed validation results in cessation of any interaction with a requestor by the complete content owner. In an embodiment, the complete content owner creates or updates a blockchain ledger entry or other record, indicating the access attempt—validation request—and the validation result.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
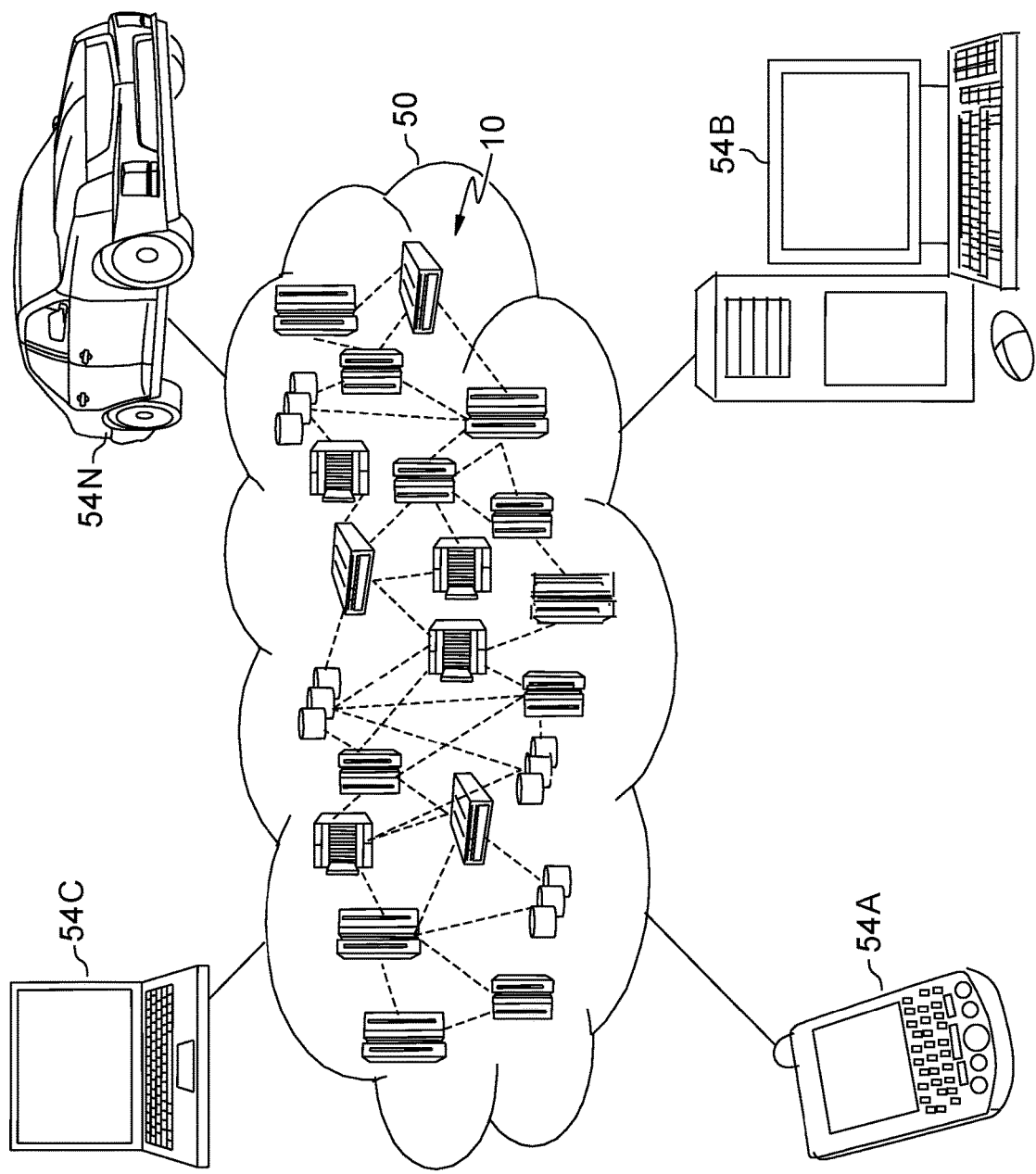
FIG. 4 depicts a cloud computing environment, according to an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
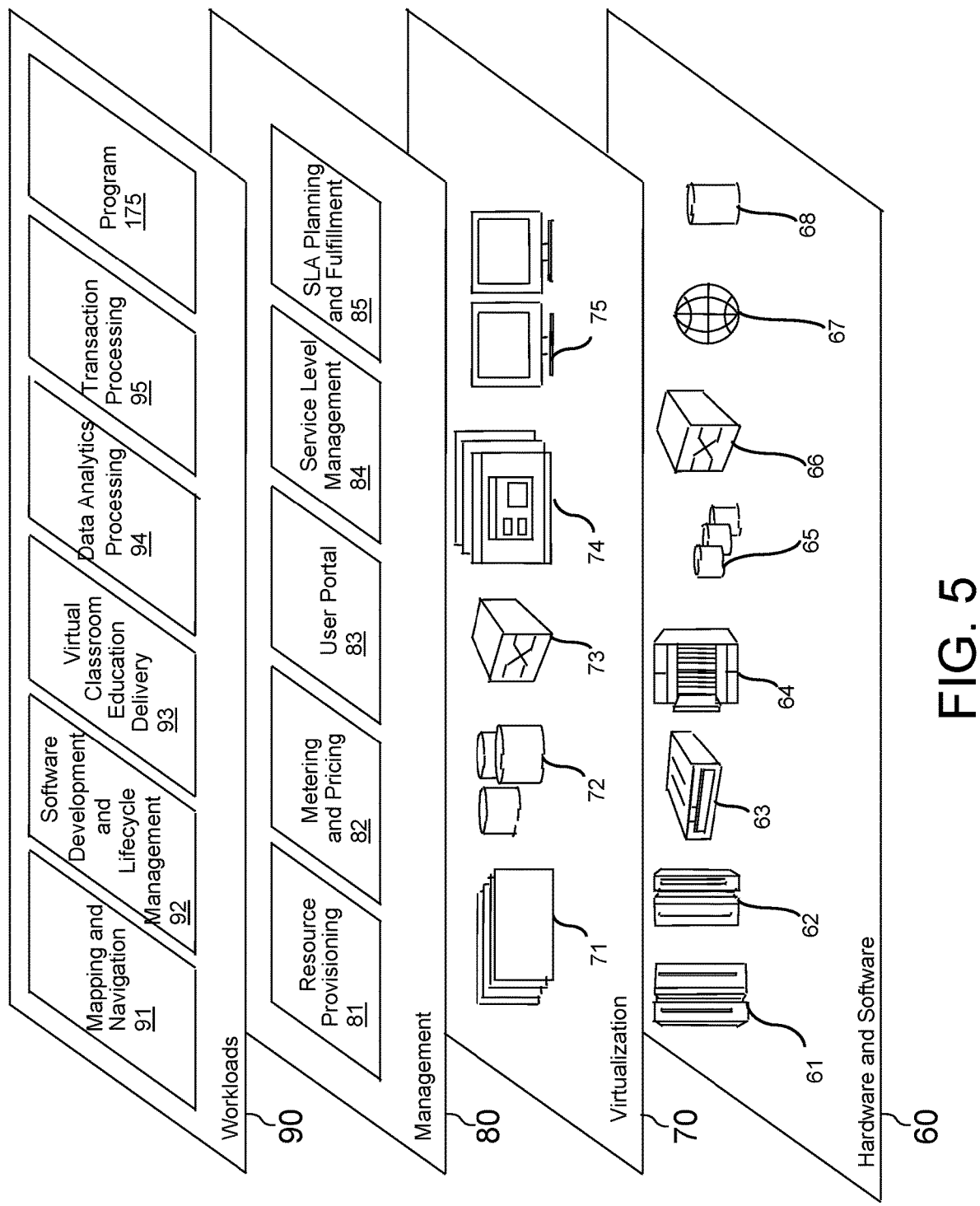
FIG. 5 depicts abstraction model layers, according to an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and access validation program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for enabling access to encrypted information, the method comprising:
    providing, by one or more computer processors, a master key and a public key to a partial content owner;
    generating, by the one or more computer processors, a ciphertext of content data according to a complete content data, at least one content data partition and the public key, wherein the content data partition comprises a portion of the complete content data;
    providing, by the one or more computer processors, the ciphertext of the content data and the public key to a validator;
    receiving, by the one or more computer processors, a validation result from the validator; and
    acting, by the one or more computer processors, upon the validation result.

2. The computer implemented method according to claim 1, wherein the content data comprises a hash function value.

3. The computer implemented method according to claim 1, wherein the content data partition includes an identifying prefix.

4. The computer implemented method according to claim 1, further comprising providing, by the one or more computer processors, the partial content owner the content data partition.

5. The computer implemented method according to claim 4, wherein the content data partition comprises a hash function value of a portion of the complete content data.

6. The computer implemented method according to claim 1, wherein the validation result is determined according to a private key generated according to the master key, the public key, and the content data partition.

7. The computer implemented method according to claim 1, further comprising generating, by the one or more computer processors, the master key and the public key.

8. A computer program product for enabling access to encrypted information, the computer program product comprising one or more computer readable storage devices and program instructions collectively stored on the one or more computer readable storage devices, the stored program instructions comprising:
    program instructions to provide a master key and a public key to a partial content owner;
    program instructions to generate a ciphertext of content according to a complete content data, at least one content data partition and the public key, wherein the content data partition comprises a portion of the complete content data;
    program instructions to provide the ciphertext of the content data and the public key to a validator;
    program instructions to receive a validation result from the validator; and
    program instructions to act upon the validation result.

9. The computer program product according to claim 8, wherein the content comprises a hash function value.

10. The computer program product according to claim 8, wherein the content data partition includes an identifying prefix.

11. The computer program product according to claim 8, the stored program instructions further comprising program instructions to provide the partial content owner the content data partition.

12. The computer program product according to claim 11, wherein the content data partition comprises a hash function value of a portion of the complete content data.

13. The computer program product according to claim 8, wherein the validation result is determined according to a private key generated according to the master key, the public key, and the content data partition.

14. The computer program product according to claim 8, the stored program instructions further comprising program instructions to generate the master key and the public key.

15. A computer system for enabling access to encrypted information, the computer system comprising:
    one or more computer processors;
    one or more computer readable storage devices; and
    stored program instructions on the one or more computer readable storage devices for execution by the one or more computer processors, the stored program instructions comprising:

program instructions to provide a master key and a public key to a partial content owner;

program instructions to generate a ciphertext of content according to a complete content data, at least one content data partition and the public key, wherein the content data partition comprises a portion of the complete content data;

program instructions to provide the ciphertext of the content data and the public key to a validator;

program instructions to receive a validation result from the validator; and program instructions to act upon the validation result.

16. The computer system according to claim 15, wherein the content data partition includes an identifying prefix.

17. The computer system according to claim 15, the stored program instructions further comprising program instructions to provide the partial content owner the content data partition.

18. The computer system according to claim 17, wherein the content data partition comprises a hash function value of a portion of the complete content data.

19. The computer system according to claim 15, wherein the validation result is determined according to a private key generated according to the master key, the public key, and the content data partition.

20. The computer system according to claim 15, the stored program instructions further comprising program instructions to generate the master key and the public key.

* * * * *